US006062360A

United States Patent [19]

Shields

[11] Patent Number: 6,062,360

[45] Date of Patent: May 16, 2000

[54] SYNCHRONIZER FOR A GEAR SHIFT MECHANISM FOR A MARINE PROPULSION SYSTEM

[75] Inventor: Waylon D. Shields, Stillwater, Okla.

[73] Assignee: Brunswick Corporation, Lake Forest, Ill.

[21] Appl. No.: 09/078,375

[22] Filed: May 13, 1998

[51] Int. Cl.[7] .............................. F16D 21/04; F16H 3/14

[52] U.S. Cl. ......................... 192/21; 192/51; 192/53.361; 192/DIG. 1; 74/378

[58] Field of Search .................................. 192/21, 48.91, 192/51, 53.361, 66.2, DIG. 1; 74/378; 440/75

[56] References Cited

U.S. PATENT DOCUMENTS

| | | | |
|---|---|---|---|
| 1,567,717 | 12/1925 | Duboscلard | 192/DIG. 1 |
| 1,931,288 | 10/1933 | Griswold | 192/53.361 |
| 1,938,824 | 12/1933 | Fish | 192/53.361 X |
| 2,091,557 | 8/1937 | Montgomery | 192/53.361 X |
| 2,349,624 | 5/1944 | Higgins | 192/66.2 |
| 2,631,707 | 3/1953 | Wahlberg | 192/53.361 X |
| 4,118,996 | 10/1978 | Eichinger | 192/21 X |
| 4,244,454 | 1/1981 | Bankstahl | 192/21 |
| 4,257,506 | 3/1981 | Bankstahl | 192/21 |
| 4,339,091 | 9/1982 | Miyake et al. | 192/21 X |
| 4,630,719 | 12/1986 | McCormick | 192/21 |
| 4,679,682 | 7/1987 | Gray, Jr. | 192/21 |
| 4,869,121 | 9/1989 | Meisenburg | 74/323 |

FOREIGN PATENT DOCUMENTS

| | | | |
|---|---|---|---|
| 57-204324 | 12/1982 | Japan | 192/51 |
| 938303 | 10/1963 | United Kingdom | 74/378 |

*Primary Examiner*—Richard M. Lorence
*Attorney, Agent, or Firm*—William D. Lanyi

[57] ABSTRACT

A synchronized gear shift mechanism is provided for a marine propulsion system. Using a hub and a sleeve that are axially movable relative to an output shaft but rotationally fixed to the shaft and to each other, the gear shift mechanism uses associated friction surfaces to bring the output shaft up to a speed that is synchronism with the selected forward or reverse gear prior to mating associated gear tooth surfaces together to transmit torque from an input shaft to an output shaft. The friction surfaces on the forward and reverse gears can be replaceable to facilitate repair after the friction surfaces experience wear.

4 Claims, 4 Drawing Sheets

SYNCHRONIZER FOR A GEAR SHIFT MECHANISM FOR A MARINE PROPULSION SYSTEM

BACKGROUND OF THE INVENTION

1. Field of the Invention

The present invention is generally related to a gear shift mechanism for a marine propulsion system and, more specifically, to a synchronizer device which allows toothed surfaces of independent rotatable components to be synchronized prior to meshing their two toothed surfaces together.

2. Description of the Prior Art

Many different types of gear shift mechanisms are well known to those skilled in the art of marine propulsion systems. In certain outboard motors, it is common to provide an axially slidable toothed mechanism which can be moved to engage either a forward gear or a reverse gear. The toothed mechanism is commonly referred to as a "dog clutch" and is used on many different styles of outboard motors to allow the operator to select either a forward or reverse gear.

In certain stem drive systems, friction surfaces of clutches are used to connect a driveshaft to an output shaft. In one particular type of stem drive gear shift mechanism, the friction surfaces are formed in the shape of frustums of cones. The clutch mechanism is moved axially to engage either of the two friction surfaces of the clutch with associated cone shaped surfaces on forward and reverse gears. This particular type of system will be described in greater detail below in conjunction with FIG. 1.

U.S. Pat. No. 4,244,454, which issued to Bankstahl on Jan. 13, 1981, discloses a cone clutch mechanism which has its forward and reverse clutch gears supported by bearings mounted on the housing, with a main shaft supported by bearings mounted on the housing in the same planes as the forward and reverse gear bearings. The male cone member is biased by two springs which each encircle cam faces on the member and bear against the forward and reverse clutch gears, respectively, in order to bias the cone member away from its center or neutral position.

U.S. Pat. No. 4,257,506, which issued to Bankstahl on Mar. 24, 1981, describes a shifter linkage for a cone clutch. A male cone member of a cone clutch mechanism has two springs, each encircling cam faces on the male cone member and bearing against the forward and reverse clutch gears, respectively, in order to bias the cone member away from its center or neutral position toward either the forward or reverse clutch gear. An eccentric motor on the shift actuator shaft engages with a circumfential groove in the male cone member to provide a vibrating force against the member for shifting. The shift means uses a cam and belt crank mechanism to convert axial movement of the shift controller to rotary movement of the actuator shaft.

U.S. Pat. No. 4,630,719, which issued to McCormick on Dec. 23, 1986, discloses a torque aided pulsed impact shift mechanism. The cone clutch sleeve on a main shaft is moved axially between forward and reverse counter-rotating gears by a yoke having mirror-image oppositely tapered cams on opposite sides thereof which are selectively rotatable to engage eccentric rings on the forward and reverse gears. This engagement drives the yolk away from the one engaged gear and toward the other gear to, in turn, drive the clutch sleeve out of engagement with the one gear such that torque applied through the cam-engaged gear ring assists clutch disengagement with the one gear such that requisite shift force decreases as speed and torque increases. The eccentric face surface of each ring actuates the yolk and drives the sleeve member out of engagement with the one gear and into engagement with the other with a pulsed impact hammer effect due to the eccentricity of the face surface as it rotates in a circumfential plane about the main shaft.

U.S. Pat. No. 4,869,121, which issued to Meisenburg on Sep. 26, 1989, describes a marine propulsion unit with an improved driveshaft arrangement. The marine propulsion unit is provided wherein the main drive shaft includes an integrally formed annular portion of enlarged diameter at the location of a previously utilized lower groove and tapers. The enlarged diameter portion increases the mass and strength of the shaft at a position which is subject to substantial torque forces, thus substantially eliminating problems of shaft fracture or breakage. In addition, the enlarged diameter portion is formed in the shape of a thrust collar so that the shaft can be accommodated by the previous known shaft mounting element without redesign of the latter.

U.S. Pat. No. 4,679,682, which issued to Gray et al on Jul. 14, 1987, discloses a marine drive shift mechanism with a detent canister centered neutral. The marine drive is provided with a shift mechanism including a detent canister assembly. A cylindrical canister contains a ball biased by a pair of concentric springs into engagement with the shifter level arm to center the latter into a neutral position. The canister assembly is a self contained modular unit inserted into the marine drive housing. The cylindrical canister has a left end wall with an aperture therethrough and has an open right end containing the ball. The first spring bears at its right end against the ball and extends axially leftward through the aperture in the left end wall of the canister and bears at its left end against the housing. The second outer concentric spring bears at its right end against the wall and is entirely within the canister and bears at its left end against the left end wall of the canister. Upon axial leftward depression of the ball by the shift lever arm, the first inner spring compresses a canister moves axially leftwardly until the left wall of the canister strikes the housing wall to close a tolerance-accommodating gap, whereby both springs compress during leftward compression of the ball.

Known marine shift mechanisms typically fall into one of two primary categories. In one type, the torque is transmitted from the output shaft of an internal combustion to a propeller shaft through a clutch mechanism which relies on friction between mating surfaces to transmit all of the torque from the engine to the propeller of the marine propulsion system. In another type, the marine propulsion system utilizes a total meshing relationship between gears to transmit torque from an internal combustion engine to a propeller shaft. However, this latter mechanism occasionally presents difficulty in shifting from neutral to either forward or reverse gear because of the significantly different speeds between the driveshaft and propeller shaft during the gear shifting procedure. Since the drive gear and output gear are not synchronized, significant impact can occur to the components of the system when a stationary gear is forced into meshing relation with a rapidly rotating gear. It would be therefore be significantly beneficial if a marine propulsion system could be developed in which a synchronizer matches the speeds of a drive gear and an output gear prior to forcing the tooth surfaces of the two gears into meshing relation with each other. It would also be significantly beneficial if the synchronizer is capable of providing a preselected degree of synchronization between rotating parts prior to meshing of gear teeth of those rotating parts. In other words, it would be beneficial if the synchronizer can be specifically designed to provide a preselected degree of synchronization prior to the gear tooth meshing procedures.

The patents described hereby are explicitly incorporated by reference in this description.

SUMMARY OF THE INVENTION

A gear shift mechanism for a marine propulsion system made in accordance with the present invention comprises an input shaft and a driving gear attached for rotation with the input shaft. It also comprises an output shaft. A forward gear is rotatably attached to the output shaft and is provided with first and second toothed surfaces and a first friction surface. A reverse gear is also rotatably attached to the output shaft and providing with third and fourth toothed surfaces and a second friction surface. The first and third toothed surfaces of the forward and reverse gears are connected in meshing relation with the driving gear which is attached to the input shaft.

It should be understood that the input shaft is typically driven by a driveshaft of internal engine. Additionally, it should be understood that the output shaft is typically connected in torque transmitting relation with a propeller shaft of a marine propulsion system. The input shaft therefore provides torque into the gear shift mechanism and the output shaft transmit the torque from the gear shift mechanism to a propeller shaft.

The present invention further comprises a hub which is rotationally fixed to the output shaft and is free to slide axially along the output shaft relative to the forward and reverse gears. The hub is provided with a third friction surface facing the first friction surface of the forward gear. In addition, the hub is provided with a fourth friction surface facing the second friction surface of the reverse gear.

A sleeve is disposed radially outward from the hub and is rotationally fixed to the hub. The sleeve is free to slide axially relative to the hub. In a preferred embodiment of the present invention, the sleeve is provided with a fifth toothed surface facing and being axially movable relative to the second toothed surface of the forward gear. In addition, the sleeve has a sixth toothed surface facing and being axially movable relative to the fourth toothed surface of the reverse gear.

A detent device is detachably connected between the hub and the sleeve. In a particular preferred embodiment of the present invention, the detent device comprises a spring and ball disposed within a hole of the hub wherein the ball fits into a groove formed in the inner surface of the sleeve. In most applications of the present invention, a plurality of detent devices would be used. In other words, a plurality of holes in the hub would be provided with individual springs and balls disposed within those holes. All of the balls would fit into the groove formed in the inner surface of the sleeve. The degree of synchronization provided by the present invention would therefore be a function of the number of detent devices provided and the spring constants of the springs within the holes in the hub.

The present invention further comprises a shifting mechanism for moving the sleeve axially relative to the forward and reverse gears. The hub and the sleeve are shaped to assure that the third friction surface moves into contact with the first friction surface prior to the fifth toothed surface moving into contact with the second toothed surface when the sleeve is moved axially toward the forward gear. In addition, the hub and the sleeve are shaped to ensure that the fourth friction surface moves into contact with the second friction surface prior to the sixth toothed surface moving into contact with the fourth toothed surface when the sleeve is moved axially toward the reverse gear. The detent device allows the hub and the sleeve to move relative to each other in response to a predetermined magnitude of force in an axial direction exerted on the sleeve by the shifting mechanism.

In a particularly preferred embodiment of the present invention, the first and second friction surfaces of the forward and reverse gear are detachable from the forward and reverse gears, respectively.

It should be understood that the gear shift mechanism of the present invention can be used in either a stern drive unit or an outboard motor.

BRIEF DESCRIPTION OF THE DRAWINGS

The present invention will be more fully and completely understood from a reading of the preferred embodiment in conjunction with the drawings in which.

DESCRIPTION OF THE PREFERRED EMBODIMENT

Figure 1:
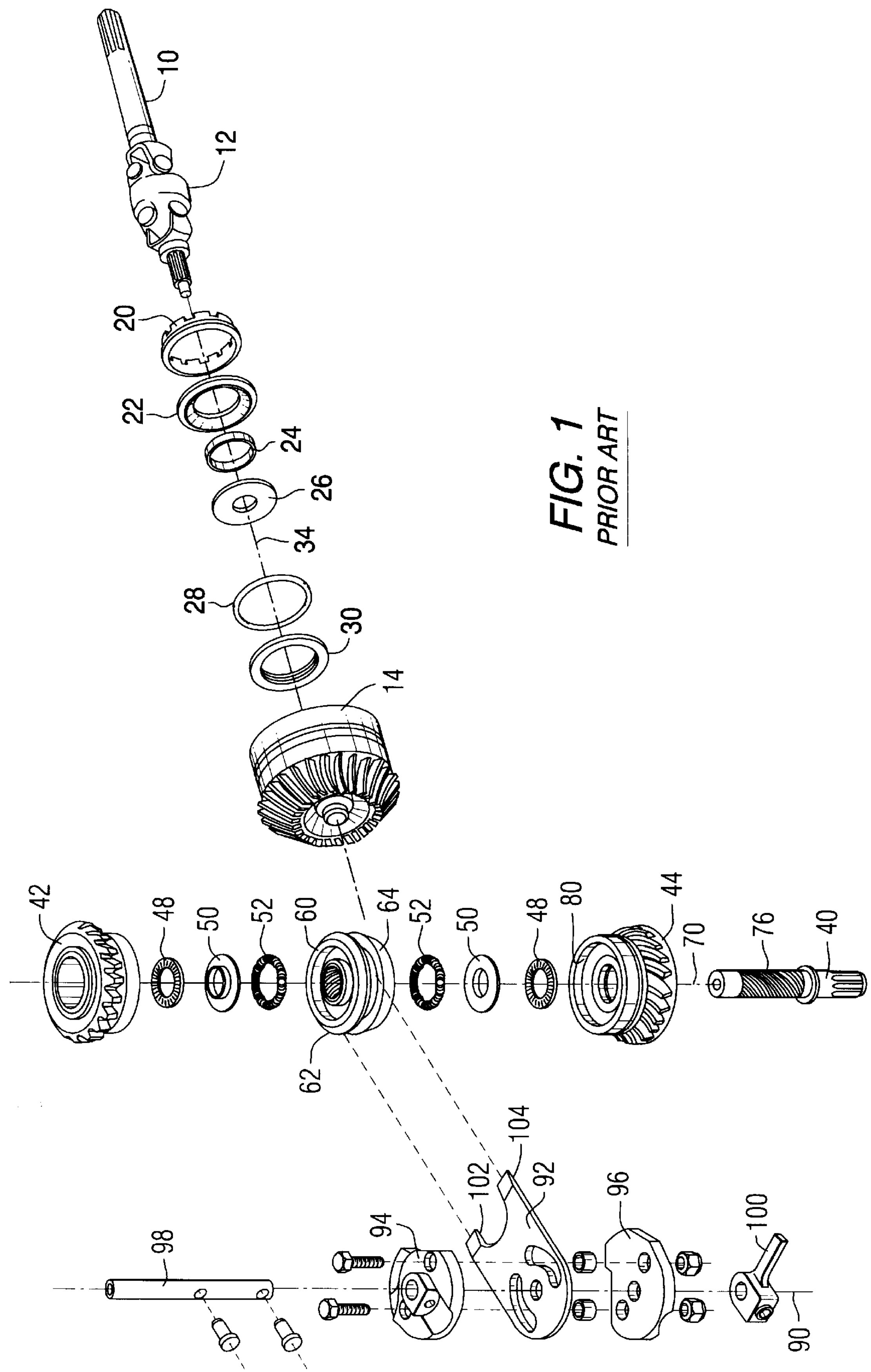
FIG. 1 is an exploded view of a known gear shift mechanism for a marine propulsion system.

Throughout the description of the preferred embodiment, like components will be identified by like reference numerals.

FIG. 1 shows an exploded view of a gear shift mechanism known to those skilled in the art and intended for use in a stern drive marine propulsion system. A driveshaft 10 is driven by an internal combustion engine which provides the primary motive force for a marine vessel. A universal joint 12 couples the input drive shaft 10 to a driving gear 14. Between the universal joint 12 and the pinion gear, or driving gear 14, are a ring nut 20, an oil seal carrier 22, an oil seal 24, a beveled washer 26, an o-ring 28, and a sealing ring 30. The components shown between the input drive shaft 10 and the driving gear 14 are all attached together to provide an assembly that rotates about axis 34. It should be understood that the components that rotate about axis 34 rotate continuously as long as the internal combustion engine is operating.

With continued reference to FIG. 1, an output shaft 40 is rotatable relative to a forward gear 42 and a reverse gear 44. Each gear is provided with a thrust bearing 48, a thrust race 50, and a garter spring 52. A clutch 60 is provided with two friction surfaces, 62 and 64, which are formed in the shape of cone frustums. The forward gear 42 and reverse gear 44 are connected in meshing relation with the driving gear 14 and rotate continually with the driving gear 14 as long as the internal combustion engine of the marine propulsion unit is operating. The forward and reverse gears rotate freely about the output shaft 40. The components shown in the vertical alignment about axis 70 all are able to rotate about axis 70.

With continued reference to FIG. 1, the clutch 60 is threaded onto the threads 76 of the output shaft 70. When the clutch is moved upward along centerline 70 to engage the friction surface 62 with an internal friction surface of the forward gear 42, the clutch 60 is caused to rotate in synchronism with the forward gear 42. This, in turn, causes the output shaft 40 to rotate and further winds the clutch 60 into friction driving engagement with the forward gear 42. Similarly, if the clutch 60 is moved downward along axis 70 the lower friction surface 64 will engage in internal friction surface 80 of the reverse gear 40 and will begin to spin with synchronism with the reverse gear 44. This, in turn, winds the clutch 60 downward on threads 76 to more firmly engage the clutch surfaces together. As can be seen from the above description, movement of the clutch 60 in an upward or downward direction causes the marine propulsion system to shift into forward or reverse gear. The output shaft 40 is connected with torque transmitting relation with a propeller shaft.

With continued reference to FIG. 1, the left side of FIG. 1 shows several components aligned along axis 90. A yoke 92 is located between an upward shift cam 94 and a lower shift cam 96. A shifter shaft 98 is disposed through central holes in the main components of the shifting mechanism. The shift lever 100 is connected to the shifter shaft 98 so that rotational movement of the shift lever 100 about centerline 90 will cause the upper and lower shift cams, 94 and 96, to rotate about axis 90. Cam surfaces on the shift cams will cause the yoke 92 to move upward or downward in response to rotation of the shift lever 100. The extending fingers, 102 and 104, of the yoke 92 are positioned between the upper friction surface 62 and the lower friction surface 64 of the clutch 60. Therefore, if the yoke 92 moves upward or downward along axis 90, the clutch 60 will move upward or downward along axis 70. This movement will engage the clutch 60 with the internal frictional surfaces of either the forward gear 42 or the reverse gear 44. When that occurs, the clutch 60 will rotate in unison with the gear with which it is engaged. This rotation of the clutch 60 will cause the output shaft 40 to rotate in the same rotational direction.

FIG. 1 shows one type of gear shifting mechanism that is used in certain stern drive units manufactured by the Mercury Marine, a division of the Brunswick Corporation.

Figure 2B:
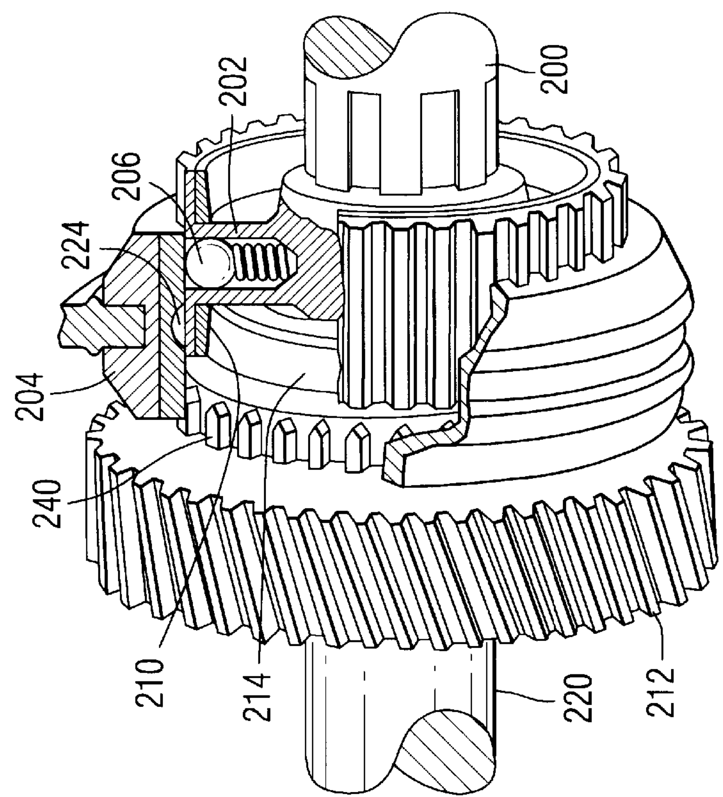
FIGS. 2*a* and 2*b* show a known type of synchronizer for automotive or industrial equipment.
Figure 2A:
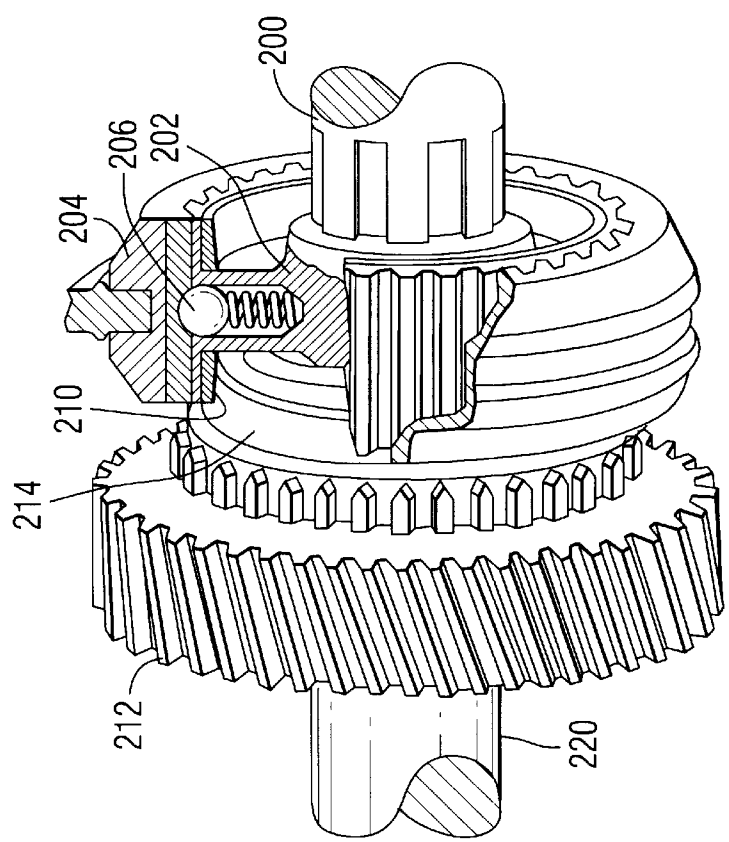

FIGS. 2*a* and 2*b* show respective views of a synchronizer mechanism used in various types of heavy machinery, such as farm machinery. FIG. 2*a* shows a mechanism as it begins to move toward engagement of its gears. An input shaft 200 is splined to a hub 202 and a sliding sleeve 204 is disposed radially outward from the hub 202. The hub 202 and the sleeve 204 rotate together because of their splined interrelationship, but can move axially relative to each other. A spring loaded ball 206 rests in a groove formed in the sleeve 204 so that the hub and sleeve maintain a common position relative to each other unless an axial force overcomes the effect of the spring against the ball 206. The hub 202 has a friction surface 210 and a driven gear 212 has a friction surface 214. In FIG. 2*a,* these two friction surfaces are not in contact with each other. An output shaft 220 is attached to the driven gear 212.

FIG. 2*b* shows the same components of FIG. 2*a,* but after the sleeve 204 has moved toward the left with a sufficient force to overcome the spring and disengage the ball 206 from the slot 224 in the sleeve 204. When the sleeve 204 is moved towards the left in FIG. 2*b,* it first moves the hub 202 toward the left until the two friction surfaces, 210 and 214, engage with each other. This causes the hub 202 and the driven gear 212 to rotate in synchronism with each other. Further movement of the sleeve 204 engages the teeth 240 with matching teeth on the sleeve 204. As a result, the input shaft 200 and the output shaft 220 rotate in synchronism with each other with torque being transmitted through the teeth 240. This action allows the sleeve 204 and its teeth to engage the teeth 240 of the driven gear 212 only after the two rotating bodies, the hub 202 and the driven gear 212, are rotating in synchronism with each other.

Figure 3:
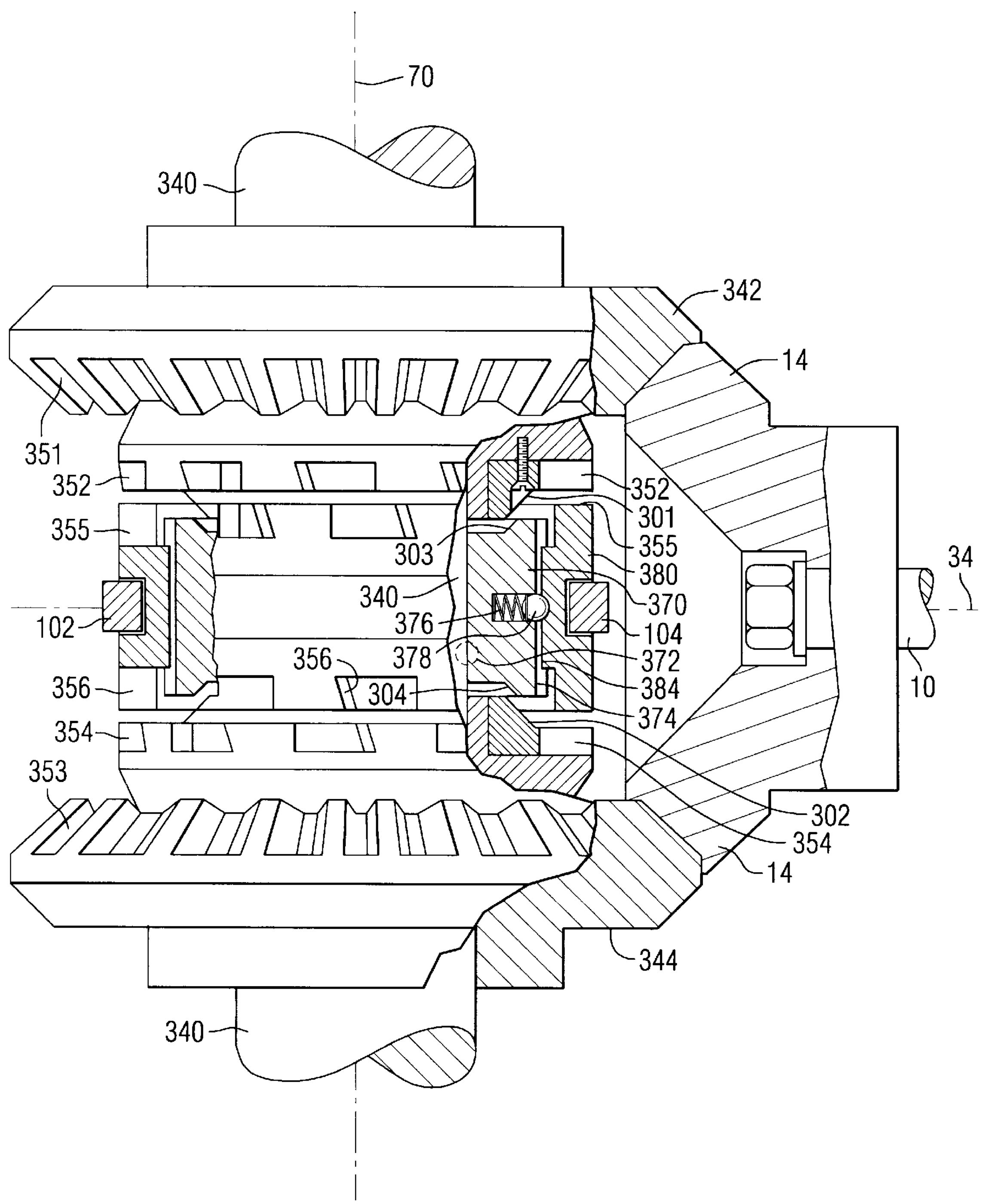
FIG. 3 illustrates the preferred embodiment of the present invention.

FIG. 3 shows a preferred embodiment of the present invention. An input shaft 10 is connected to an internal combustion engine (not shown in FIG. 3) or other motive device which provides torque to operate a marine propulsion device. The driving gear 14 is attached to the input shaft 10 and rotates as long as the internal combustion engine is operating. The forward gear 342 and the reverse gear 344 are connected in toothed meshing relation with a driving gear 14 and rotate about axis 70 at all times, as long as the driving gear 14 is being rotated about axis 34 by the internal combustion engine. It should be understood that the forward gear 342 and reverse gear 344 are generally similar in structure and function to the forward and reverse gears, 42 and 44, described above in conjunction with FIG. 1. However, both forward and reverse gears in FIG. 3 are modified to perform certain functions in conformance with the operation of the present invention. For example, the forward gear 342 in FIG. 3 is provided with a first friction surface 301 and two toothed surfaces, 351 and 352. The first toothed surface 351 has a plurality of teeth that are engaged in meshing relation with teeth of the driving gear 14 to cause the forward gear 342 to rotate about axis 70. The second toothed surface 252 will be described in greater detail below. The reverse gear 344 is provided with a third toothed surface 253 and a fourth toothed surface 354. It is also provided with a second friction surface 302. Both the forward and reverse gears, 342 and 344, are free to rotate about the output shaft 340 in response to rotation of the driving gear 14 and the toothed meshing relationships between the driving gear 14 and both the forward and reverse gears.

A hub 370 is rotationally fixed to the output shaft 340 by a splined arrangement 372 wherein splined grooves on the inner surface of the hub 370 are interstitially associated with splined teeth on the outer surface of the output shaft 340 in the region identified by reference numeral 372. This allows the hub 370 to move axially along the output shaft 370, but remain rotational fixed to the output shaft. Therefore, when the hub 370 is caused to rotate, the output 370 must rotate with it. The hub 370 is provided with a third friction surface 303 and a fourth friction surface 304. As can be seen, the third friction surface 303 faces the first friction surface 301 of the forward gear 342 which the fourth friction surface 304 faces the second friction surface 302 of the reverse gear 344. Axial movement of the hub 370, along axis 70, can place the third friction surface in contact with the first friction surface 301 or, alternatively, can place the fourth friction surface 304 in contact with the second friction surface.

Figure 4:
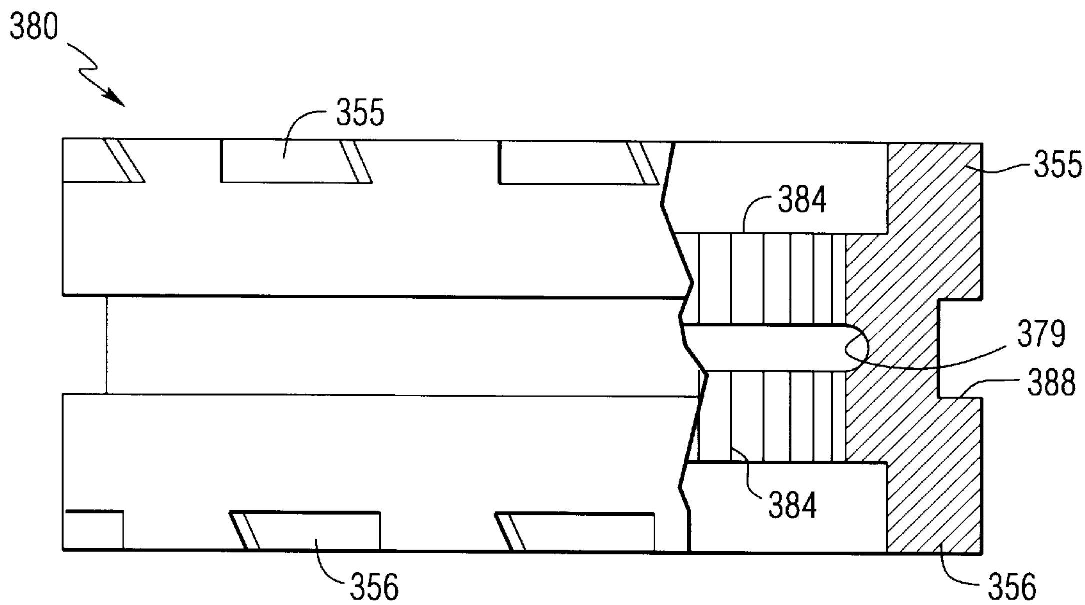
FIG. 4 is an isolated view of the sleeve of the present invention.

A sleeve 380 is disposed radially outward from the hub 370 and is rotationally fixed to the hub. However, the sleeve 380 is free to move axially relative to the hub 370 if a sufficient axial force is exerted on the sleeve 380. The sleeve 380 and the hub 370 are connected together in a splined relationship 372. Internally directed spline teeth 384 on the inner surface of the sleeve 380 are in meshing relation with externally directed splined teeth 374 on the outer surface of the hub 370. This splined relationship allows the sleeve and hub to move axially relative to each other and attaches them rotationally to each other. The detent mechanism, which comprises a spring 376 and a ball 378 in a preferred embodiment, maintains the relative position of the hub 370 and sleeve 380 shown in FIG. 3 because the ball 378 rests in an internal groove formed in the inner surface of the sleeve 380. The force provided by the spring 376 maintains the relative positions of the hub and sleeve until an axial force of sufficient magnitude causes the ball 378 to move out of its associated slot in the sleeve 380. The force which is required to overcome the spring 376 determines the degree of contact between the first friction surface 301 and the third friction surface 303 prior to the engagement of the teeth of the two toothed surfaces 352 and 355. The force provided by the spring 376 also determines the degree of contact between friction surfaces 302 and 304 prior to the meshing of the teeth of the two toothed surfaces 354 and 356. In other words, if spring 376 has a relatively high spring constant, the ball 378 will resist the movement of sleeve 380 relative to the hub 370. If this resistance is high, the friction surfaces will be pressed against each other with a significant force prior to the release of the detent mechanism which allows the sleeve 380 to move upward past the hub 370 and engage the teeth. This same result occurs when the sleeve 380 is moved downward in FIG. 3. An increased detent force can also be provided by including a larger plurality of detents in the system. In other words, more detent holes in the hub 370 would be provided so that more springs 376 and balls 378 can be included. Naturally, all of the balls of the plurality of detent devices would be disposed within groove 379 which is shown in FIG. 4.

A shifting mechanism, similar to the yoke 92 described above in conjunction with FIG. 1, is used to move the sleeve 380 axially relative to the forward and reverse gears, 342 and 344. The two fingers, 102 and 104, of a shifting yoke are shown disposed within an outer groove formed in the sleeve 380.

A fifth toothed surface 355 and a sixth toothed surface 356 are formed in the sleeve and positioned to face the second toothed surface 352 and the fourth toothed surface 354, respectively, of the forward and reverse gears. In operation, the yoke can be raised or lowered to move the sleeve 380 upward or downward in FIG. 3.

The hub 370 and sleeve 380 are shaped to assure that the friction surface of the hub, 303 or 304, makes contact with the friction surface of the forward or reverse gear prior to the toothed surface, 355 or 356, of the sleeve making contact with the toothed surface, 352 or 354, of the forward or reverse gears. In other words, if the sleeve 380 is moved upward in FIG. 3, the third friction surface 303 of the hub 370 will move into contact with the first friction surface 301 of the forward gear 342 prior to the fifth toothed surface 355 moving in meshing relation with the second toothed surface 352. When the third friction surface begins to make contact with the first friction surface 301, the hub 370 is caused to rotate about axis 70 in unison with the rotation of the forward gear 342. Since the hub 370 is splined to the output shaft 340, this also causes the output shaft to begin to rotate about axis 70. As the sleeve 380 continues to move upward, the fifth toothed surface 355 moves into engagement with the second toothed surface 352. However, by the time that these two toothed surfaces move into engagement with each other, the hub 370 and sleeve 380 are rotating in absolute or approximate synchronism with the rotation of the forward gear 342. Therefore, the gear teeth can smoothly mesh with each other. It should be understood that when the sleeve 380 is moved upward after the third friction surface 303 moves into engagement with the first friction surface 301, the axial force on the sleeve will overcome the detent force of the ball 378 in the groove of the sleeve. This will cause the ball 378 to move out of the groove and allow the sleeve 380 to move upward relative to the hub 370 which is contact with the forward gear 342. As the sleeve 380 continues to move upward its fifth toothed surface 355 engages with the second toothed surface 352 of the forward gear 342. As described above, the number of detent devices and the spring constants of springs 376 will determine the amount of force needed to overcome the detent devices. If that force is generally low in magnitude, the gear teeth can be forced into meshing relation prior to complete and absolute synchronism between the rotating devices. If the detent force is too low, relative motion between the two facing toothed surfaces can cause chatter as the teeth mesh together. On the other hand, if the force provided by the detent devices is too high, complete and absolute synchronism may be achieved by the contacting friction surfaces and meshing of the teeth might be difficult because of the complete lack of relative movement therebetween. As a result, it is beneficial to provide a slight amount of relative movement between the toothed surfaces as the teeth are moved into meshing relation with each other. For any particular system, this degree of synchronism can be determined by selecting the number of detent devices used in the system and the spring constants of the springs 376.

In a similar manner, downward movement of the yoke will cause the sleeve 380 and the hub 370 to move downward toward the reverse gear 344, which is rotating in response to rotation of the driving gear 14. The hub and sleeve are shaped and sized to assure that the fourth friction surface 304 moves into contact with the second friction surface 302 prior to the sixth toothed surface 356 moving in engagement with the fourth toothed surface 354. This immediately causes the hub 370 to begin to rotate about axis 70 in synchronism with the reverse gear 344. Further downward force of the sleeve 380 cause the ball 378 to move out of the slot and permits axial movement of the sleeve 380 relative to the hub 370. This further axial movement causes the sixth toothed surface 356 to move into engagement with the fourth toothed surface 354 of the reverse gear 344. However, by the time the sixth and fourth toothed surfaces move into engagement with each other, the hub and sleeve are rotating in synchronism with the reverse gear 344.

FIG. 4 shows the sleeve 380 of the present invention. The cutaway view of FIG. 4 shows the internal splines 384 and the groove 379 in which the balls 378 rest when the hub and sleeve are maintained in a neutral position relative to each other. An outer groove 388 is formed in the sleeve 380 to receive the two fingers, 102 and 104, of the yoke 92 described above in conjunction with FIG. 1. The fifth toothed surface 355 and sixth toothed 356 are also shown in FIG. 4.

Figure 5:
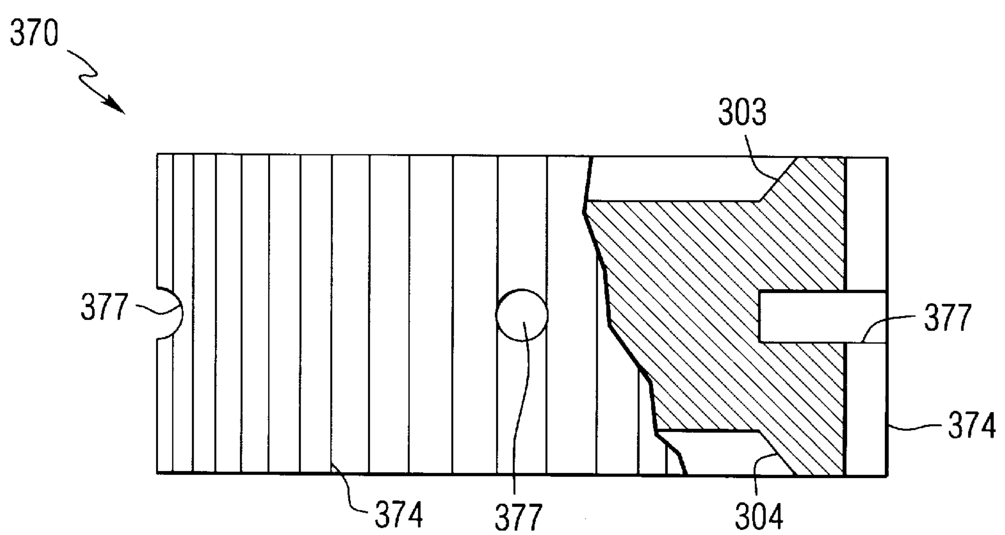
FIG. 5 is an isolated view of the hub of the present invention.

FIG. 5 shows the hub 370 of the present invention along with holes 377 which is shaped to receive the springs 376 and balls 378 described above in conjunction with FIG. 3. The outer surface of the hub 370 is provided with spline teeth 374 which are shaped to be engaged with the spline teeth 384 on the inner surface of the sleeve 380 described above in conjunction with FIGS. 3 and 4. The third friction surface 303 and fourth friction surface 304 of the hub are identified in FIG. 5. As described above, the number of holes 377 and the force provided by springs 376 determine the force required to overcome the detent devices. This force can be finely selected to suit virtually any application of the present invention. The force provided by the detent devices determines the degree of synchronism of the moving components at the time the gear teeth are moved into meshing relation with each other. It is generally desirable to provide a slight degree of relative movement of the rotating components at the time that meshing occurs in order to facilitate the tooth engagement procedure.

Figure 6:
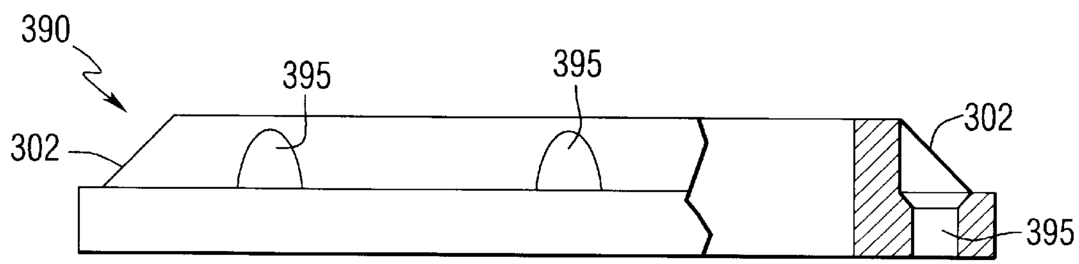
FIG. 6 shows a replaceable insert for providing a friction surface for either the forward or reverse gears of the propulsion system.

With reference to FIG. 3, it can be seen that the first and second friction surfaces, 301 and 302, are provided by removable inserts which can be replaced. These replaceable inserts can be rings which can be attached to the respective forward and reverse gears by a plurality of screws. FIG. 6 shows an exemplary removable insert 390 which is used to provide the second friction surface 302 associated with the reverse gear 344. A plurality of holes 395 are formed axially through portions of the replaceable inserts 390 to allow screws to pass through the insert and be threaded into the reverse gear 344. As is well known to those skilled in the art, the holes 395 can be countersunk as shown in FIG. 6 to prevent contact between the fourth friction surface 304 of the hub 370 in the second friction surface 302 formed as a surface of the insert 390. An identical construction can be used to provide a replaceable insert for the forward gear 342 in order to provide the first friction surface 301.

The present invention provides a synchronized gearshift mechanism for a marine propulsion system. By incorporating certain principles used in automotive and industrial propulsion systems in combination with a marine gear shift mechanism, the present invention allows a marine propulsion system to incorporate a synchronized gear shift mechanism that smoothly synchronizes the output shaft with the forward or reverse gears prior to meshing the driving teeth of a dog clutch to transmit the torque from the input shaft to the output shaft.

As a result of the characteristics of the present invention, a transmission can be constructed so that the system requires only very low shift loads to engage the opposing teeth of rotating components. In addition, the degree of synchronization prior to meshing the opposing toothed surfaces is selectable by determining the number of detent devices and the spring constants of the springs used in the detent devices. Another advantage of the present invention is that it is fail safe because if the synchronizer rings become worn, the device will continue to shift with only a slight degree of noticeable harshness during the meshing procedure. The present invention also provides replaceable friction surfaces. This replaceability is important in the event that the friction surfaces become worn. The cost to repair or refurbish a marine propulsion device when the friction surfaces become worn are therefore significantly reduced.

Although the present invention has been described with considerable detail and illustrated with specificity to show one particular preferred embodiment of the present invention, it should be understood that alternate embodiments are also within its scope.

I claim:

1. A gear shift mechanism for a marine propulsion system, comprising:

an input shaft;

a driving gear attached for rotation with said input shaft;

an output shaft;

a forward gear rotatably attached to said output shaft, said forward gear having first and second toothed surfaces and a first friction surface, said first friction surface being manually detachable from said forward gear;

a reverse gear rotatably attached to said output shaft, said reverse gear having third and fourth toothed surfaces and a second friction surface, said second friction surface being manually detachable from said reverse gear, said first and third toothed surfaces of said forward and reverse gears being connected in meshing relation with said driving gear;

a hub which is rotationally fixed to said output shaft and free to slide axially along said output shaft relative to said forward and reverse gears, said hub having a third friction surface facing said first friction surface of said forward gear, said hub having a fourth friction surface facing said second friction surface of said reverse gear;

a sleeve disposed radially outward from said hub, said sleeve being rotationally fixed to said hub and free to slide axially relative to said hub, said sleeve having a fifth toothed surface facing and being axially movable relative to said second toothed surface, said sleeve having a sixth toothed surface facing and being axially movable relative to said fourth toothed surface;

a detent device detachably connecting said hub to said sleeve; and a shifting mechanism for moving said sleeve axially relative to said forward and reverse gears, said hub and said sleeve being shaped to assure that said third friction surface moves into contact with said first friction surface prior to said fifth toothed surface moving into contact with said second toothed surface when said sleeve is moved axially toward said forward gear and that said fourth friction surface moves into contact with said second friction surface prior to said sixth toothed surface moving into contact with said fourth toothed surface when said sleeve is moved axially toward said reverse gear, said detent device allowing said hub and said sleeve to move relative to each other in response to a predetermined magnitude of force in an axial direction exerted on said sleeve by said shifting mechanism.

2. The gear shift mechanism of claim 1, wherein:

said detent device comprises a spring loaded ball disposed within a hole in said hub and a groove formed in said sleeve, said groove being shaped to receive said ball.

3. The gear shift mechanism of claim 1, wherein:

said gear shift mechanism is disposed within a stern drive unit.

4. The gear shift mechanism of claim 1, wherein:

said gear shift mechanism is disposed within an outboard motor.

* * * * *